United States Patent
Katsu et al.

(10) Patent No.: US 6,747,426 B2
(45) Date of Patent: Jun. 8, 2004

(54) MOTOR CONTROL APPARATUS AND METHOD

(75) Inventors: Takuji Katsu, Kanagawa (JP); Souhei Tanaka, Kanagawa (JP); Masafumi Wataya, Kanagawa (JP); Akira Kuronuma, Tokyo (JP); Toru Nakayama, Kanagawa (JP); Akinori Horiuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/419,752

(22) Filed: Apr. 22, 2003

(65) Prior Publication Data
US 2003/0201740 A1 Oct. 30, 2003

(30) Foreign Application Priority Data
Apr. 26, 2002 (JP) .......................... 2002-127275
Apr. 1, 2003 (JP) .......................... 2003-098045

(51) Int. Cl.$^7$ ............................................. H02K 23/00
(52) U.S. Cl. ...................... 318/254; 318/569; 318/567
(58) Field of Search ............................ 318/139, 254, 318/439, 567, 569; 358/1.17; 347/3

(56) References Cited

U.S. PATENT DOCUMENTS 6,473,195 B1 * 10/2002 Yun et al. .................. 358/1.17
6,520,611 B2 * 2/2003 Ishinaga et al. ............... 347/3
2001/0045806 A1   11/2001 Morita ...................... 318/567

FOREIGN PATENT DOCUMENTS

| EP | 1 154 341 A2 | 11/2001 |
| JP | 2001-286189 | 10/2001 |
| JP | 2001-286190 | 10/2001 |
| JP | 2001-327191 | 11/2001 |

* cited by examiner

*Primary Examiner*—Karen Masih
(74) *Attorney, Agent, or Firm*—Fitzpatrick, Cella, Harper & Scinto

(57) ABSTRACT

A motor control apparatus has a motor driver for driving a motor in accordance with an input of digital-format drive data of a predetermined length, thereby driving a mechanism using the motor as a power source. The drive data, which has been made to correspond to a plurality of drive patterns, is stored in a memory, part of the drive data, which has been read out from the memory by DMA, is replaced with other data, and the resultant data is output to the motor driver. Thus, different drive data can be generated by replacing a part of the drive data stored in the memory with other data, and the generated data can be transferred to the motor driver. This makes it possible to reduce the memory capacity needed for motor control.

13 Claims, 15 Drawing Sheets

FIG. 10

| DATA No | NAME | Function |
|---|---|---|
| 15 | PHASE A | A-PHASE CURRENT DIRECTION ("1": +A; "0": -A) |
| 14 | Current:A3 | SETS A-PHASE CURRENT VALUE MAKES IT POSSIBLE TO DIVIDE ONE STEP INTO 16 PARTS USING FOUR BITS "0000": TURNS OFF OUTPUT |
| 13 | Current:A2 | |
| 12 | Current:A1 | |
| 11 | Current:A0 | |
| 10 | DECAY MODE A1 | "00":DECAY MODE0,"01":DECAY MODE1 |
| 9 | DECAY MODE A0 | "10":DECAY MODE2,"11":DECAY MODE3 |
| 8 | PHASE B | B-PHASE CURRENT DIRECTION ("1": +B; "0": -B) |
| 7 | Current B3 | SETS B-PHASE CURRENT VALUE MAKES IT POSSIBLE TO DIVIDE ONE STEP INTO 16 PARTS USING FOUR BITS "0000": TURNS OFF OUTPUT |
| 6 | Current B2 | |
| 5 | Current B1 | |
| 4 | Current B0 | |
| 3 | DECAY MODE B1 | "00":DECAY MODE0,"01":DECAY MODE1 |
| 2 | DECAY MODE B0 | "10":DECAY MODE2,"11":DECAY MODE3 |
| 1 | TORQUE1 | Data No0,1="11":100%,"01":80%,"10":70% |
| 0 | TORQUE0 | "00":50%  COMMON TO BOTH A AND B PHASES |

FIG. 11

| CURRENT(4bit) | 1111⇒100% | 1011⇒ 88% | 0111⇒ 63% | 0011⇒ 29% |
|---|---|---|---|---|
| | 1110⇒ 98% | 1010⇒ 83% | 0110⇒ 56% | 0010⇒ 20% |
| | 1101⇒ 96% | 1001⇒ 77% | 0101⇒ 47% | 0001⇒ 10% |
| | 1100⇒ 92% | 1000⇒ 71% | 0100⇒ 38% | 0000⇒ 0% |

( STANDARD VALUE OF CHOPPER CURRENT )

F I G. 12

| DECAY MODE(2bit) | DECAY MODE0 Slow Decay Mode |
| --- | --- |
| | DECAY MODE1 Mixed Decay Mode 37.5% |
| | DECAY MODE2 Mixed Decay Mode 75% |
| | DECAY MODE3 Fast Decay Mode |

FIG. 13A  W1-2 PHASE SEQUENCE
DECAY SETTING: POSITIVE-GOING: MIXED DECAY 37.5% DRIVE; NEGATIVE-GOING: MIXED DECAY 75% DRIVE
TORQUE SETTING: 100%

MOTOR CONTROL APPARATUS AND METHOD

FIELD OF THE INVENTION

This invention relates to an apparatus and method for controlling a motor. More particularly, the invention relates to control of a motor having a motor driver for driving the motor in accordance with an input of digital-format drive data of a predetermined length.

More specifically, the present invention relates to a motor control apparatus and method in which a portion of motor drive data, which is generated by a motor controller of a printing apparatus or the like, is replaced with other data in an arrangement in which the motor drive data is acquired from a memory by DMA (Direct Memory Access).

BACKGROUND OF THE INVENTION

Printers are becoming increasingly popular and great strides are being made in printing techniques as well. Printers are adapted so as to print images on paper based upon image information. A printing method of much interest employed in such printers is the ink-jet printing method, which is method is a method of performing printing by ejecting ink onto paper from a printhead. This method is advantageous in that a highly precise image can be printed at high speed and is superior to other printing methods in terms of running cost and quietness.

In an ink-jet printer that employs the ink-jet printing method, generally stepping motors are used for paper-feed, carriage movement and recovery operations. Recently, there has been an increase in arrangements in which control of these motors is carried out not by a CPU but by a motor control circuit provided within a special-purpose system LSI (referred to as an "ASIC" below) chip that controls the overall printer.

The reason for this is that owing to the more complicated stopping control that accompanies an increase in printer resolution and in order to lower machine noise, there has been an increase in arrangements in which the motor excitation method is W1-2 phase excitation and 2W1-2 phase excitation and drive is by microsteps. Further, owing to an increase in the printing speed of these printers, motor driving speed also is higher than heretofore. As a consequence, the timing at which phase excitation switching takes places speeds up and therefore the burden upon the CPU increases. With conventional sequence control, therefore, situations arise in which the system cannot keep up with the higher switching speed.

Accordingly, an arrangement has been adopted in which a special-purpose hardware circuit for motor control is provided within an ASIC, data in a drive table stored on a ROM (Read-Only Memory) is expanded in a RAM, this data is incorporated in the special-purpose hardware for motor control by DMA transfer, and the data is transmitted to a motor driver to control the motor without the intermediary of a CPU.

For example, the specifications of Japanese Patent Application Laid-Open Nos. 2001-286190 and 2001-286189 (these two applications correspond to U.S. Patent Publication No. 2001/045806 A1) disclose a method in which data of a motor drive table that has been stored in a RAM is incorporated in a motor driver controller successively by DMA transfer without the intermediary of a CPU, thereby controlling a motor driver and alleviating the load on a CPU.

A conventional motor control method using DMA transfer will be described in detail with reference to the drawings.

FIG. 2 is a block diagram illustrating a prior-art arrangement for performing motor control using DMA transfer. An arrangement in which drive data is transferred to a motor driver serially will be taken as an example.

As shown in FIG. 2, this control arrangement includes a RAM 1, a printer controller LSI (ASIC) chip 2, a motor driver 3, a CPU 4 and a ROM 5. Various functional blocks for controlling printer operation are incorporated within the printer controller LSI 2. Mainly the portions relating to motor drive are illustrated. A DMA controller 6 performs DMA transfer with respect to the RAM 1 based upon a RAM access request of each functional block. Motor drive data that has been stored in a ROM 5 also is developed in the RAM 1 via the DMA controller 6 within the ASIC 2.

A motor driver controller 7 includes a control block 8, a data controller 9, a serial data generator 12 and a timing controller 13. The control block 8 is provided with a control register for driving the motor drive controller. On the basis of the content of the control register, the control block 8 executes sequential control of the functions within the motor drive controller. The writing of data to the control register is performed by the CPU. The data controller 9 requests the DMA controller 6 for transfer of DMA data from a designated address of the RAM 1. Reference numerals 10 and 11 denote data that the data controller 9 has acquired and latched. The data 10 is motor driver control data, and the data 11 is time data. A serial data converter 12 converts the latched drive data from a parallel signal to serial data, which is synchronized to a transfer clock, by a shift register. A timing controller 13 manages excitation time based upon the latched time data.

FIG. 3 is a diagram illustrating an example of transfer timing for transfer of drive data to the motor driver. FIG. 3 illustrates the timing of the strobe signal 14, transfer clock 15 and drive data 16 transmitted to the motor driver 3 from the printer controller LSI 2, which includes the motor driver controller 7 of FIG. 2, as well as the internal structure of the motor driver 3.

The drive data 16 is stored successively in a shift register 17 within the motor driver 3 in sync with the transfer clock 15. The data is latched in a latch 18 by the strobe signal 14. The output of the motor driver is finalized, after the data is latched within the latch 18, at the rising edge of the strobe signal 14. That is, excitation time is managed at the intervals at which the strobe signal 14 is generated. More specifically, the latched data is partitioned into bits on a per-control-element basis and is used in control of each drive control block.

A torque data controller 19 is for changing over the levels of the currents of A and B phases while maintaining the set values of the currents of these two phases. As a result, the current applied to the motor can be set stepwise in a state in which the setting of the ratio of the currents of the A and B phases is the same. This makes it possible to set torque. Reference numerals 20, 21 and 22 denote control blocks on the side of the A phase, in which block 20 controls the flow of regenerative current (decay mode), block 21 the current value and block 22 the phase with respect to the A-phase output current. Reference numerals 23, 24 and 25 denote control blocks on the side of the B phase. Control relating to these blocks is similar to that of the blocks on the A-phase side.

In the above-described example of the prior art, however, data of the motor drive table that has been expanded in the RAM is incorporated in the motor driver controller by DMA transfer. The motor driver controller transfers this data to the motor driver at the set excitation time intervals. Specifically, the data of the drive table that has been stored in the RAM is transferred to the motor driver as is. As a result, in a case where it is desired to change only certain specific information such as torque setting bits, it is necessary to rewrite the specific bits, which are desired to be changed in the drive table within the RAM, by a CPU in one-byte or two-byte (=one word) units, or to store these specific bits in another area of the RAM as data of another motor drive table.

If it is so arranged that the specific bit of the drive table is rewritten by the CPU, the CPU is occupied for the period of time required for the rewriting of the drive table data. During this time the CPU cannot execute other tasks and, hence, there is the possibility that the overall performance of the printer will decline. On the other hand, assume that the arrangement is such that the data of another motor drive table is stored in another area of the RAM. If drive modes in which the settings differ by even one bit in the drive data exist, drive table data must be set in an amount equivalent to the number of these drive modes. This makes it necessary to increase the capacity of the RAM and the capacity of the ROM as well.

SUMMARY OF THE INVENTION

Accordingly, an object of the present invention is to provide a motor control apparatus that makes it possible to reduce the memory capacity used in control of a memory without increasing the load upon a CPU.

Another object of the present invention is to provide a motor control method that makes it possible to reduce the memory capacity used in control of a memory without increasing the load upon a CPU.

According to one aspect of the present invention, the foregoing objects are attained by providing an apparatus for controlling a motor that drives a mechanism using the motor as the power source, the apparatus comprising: a motor driver for driving the motor in accordance with an input of digital-format drive data of a predetermined length; a memory for storing the drive data, which has been made to correspond to a plurality of drive patterns; and driver control means for replacing part of the drive data, which has been read out from the memory by DMA, with other data and outputting the resultant data to the motor driver.

According to another aspect of the present invention, the foregoing objects are attained by providing a method of controlling a motor in a motor control apparatus, which has a motor driver that drives a motor in accordance with an input of digital-format data of a predetermined length, for driving a mechanism using the motor as a power source, the method comprising: a storage step of storing the drive data, which has been made to correspond to a plurality of drive patterns, in a memory; and a driver control step of replacing part of the drive data, which has been read out from the memory by DMA, with other data and outputting the resultant data to the motor driver.

Thus, according to the present invention, there is provided a motor control apparatus having a motor driver for driving a motor in accordance with an input of digital-format drive data of a predetermined length, the control apparatus driving a mechanism using the motor as a power source. The drive data, which corresponds to a plurality of drive patterns, is stored in a memory, and a portion of the drive data read out from the memory by DMA is replaced with other data and output to the motor driver.

If this arrangement is adopted, different drive data can be generated by replacing a part of the drive data stored in the memory with other data, and the generated data can be transferred to the motor driver. For example, be replacing a torque setting bit of the drive motor with other data, the motor can be driven at any torque using one type of drive data.

Accordingly, in an arrangement that uses DMA transfer, motor drive data stored in a memory can be diminished and therefore the capacity of the memory used in motor control can be reduced.

Preferably, the drive data comprises bits of a predetermined length, and the drive control means includes a buffer for storing the drive data, a register for storing the other data and a selector for selecting replacement data.

The driver control means may include data output means for outputting the drive data, part of which has been replaced, to the motor driver as serial data, or data output means for outputting the drive data, part of which has been replaced, to the motor driver as parallel data.

Preferably, the motor is a stepping motor.

According to other aspects of the present invention, there are provided a computer program for implementing the above-described motor control method by a computer, and a storage medium storing this computer program.

According to further aspect of the present invention, there is provided an electronic apparatus that includes a motor control apparatus having a motor driver that drives a mechanism using the motor as a power source and drives the motor in accordance with an input of digital-format drive data of a predetermined length, a memory for storing the drive data, which has been made to correspond to a plurality of drive patterns, and driver control means for replacing part of the drive data, which has been read out from the memory by DMA, with other data and outputting the resultant data to the motor driver, wherein: the driver control means generates an interrupt signal after read-out and output of the drive data are executed a predetermined number of times in succession; and a CPU of the electronic apparatus responds to the interrupt signal by specifying an address from which the driver control means reads out data from the memory and changing the other data.

According to still another aspect of the present invention, there is provided a printing apparatus for perform printing using a motor, comprising: a motor driver for driving the motor in accordance with an input of digital-format drive data of a predetermined length; a memory for storing the drive data, which has been made to correspond to a plurality of drive patterns; driver control means for changing part of the drive data, which has been read out from the memory by DMA, to other data and outputting the resultant data to the motor driver, and for generating an interrupt signal after read-out and output of the drive data are executed a predetermined number of times in succession; and control means, responsive to the interrupt signal, for specifying a read-out address of the memory with respect to the driver control means, and setting a change in the drive data.

The above objects of the present invention is also attained by providing a motor driver controller, to which digital-format drive data of a predetermined length stored in a memory is input by DMA means, for outputting drive data to a motor driver that drives the motor, comprising: a mask data register for storing mask data that rewrites the drive data; a rewrite register for rewriting predetermined bits by the mask data, which has been stored in the mask data register, when the drive data input by the DMA means is latched, and for holding the resultant data; and data output means for outputting drive data, which has entered from the rewrite register, to the motor driver.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 10 is a diagram illustrating the content of serial data for performing motor drive according to the first embodiment;

FIG. 11 is a diagram illustrating the relationship between 4-bit set values and current values;

FIG. 12 is a diagram illustrating the relationship between 2-bit set values and modes set;

FIGS. 13A and 13B are diagrams illustrating an example of a pattern of W1-2 phase drive;

DETAILED DESCRIPTION OF THE PREFERRED EMBODIMENTS

Preferred embodiments of the present invention will now be described in detail in accordance with the accompanying drawings.

The embodiments will be described taking as an example an ink-jet printer that uses the motor control apparatus of the present invention.

(First Embodiment)
(Overall Printer Structure)

Figure 4:
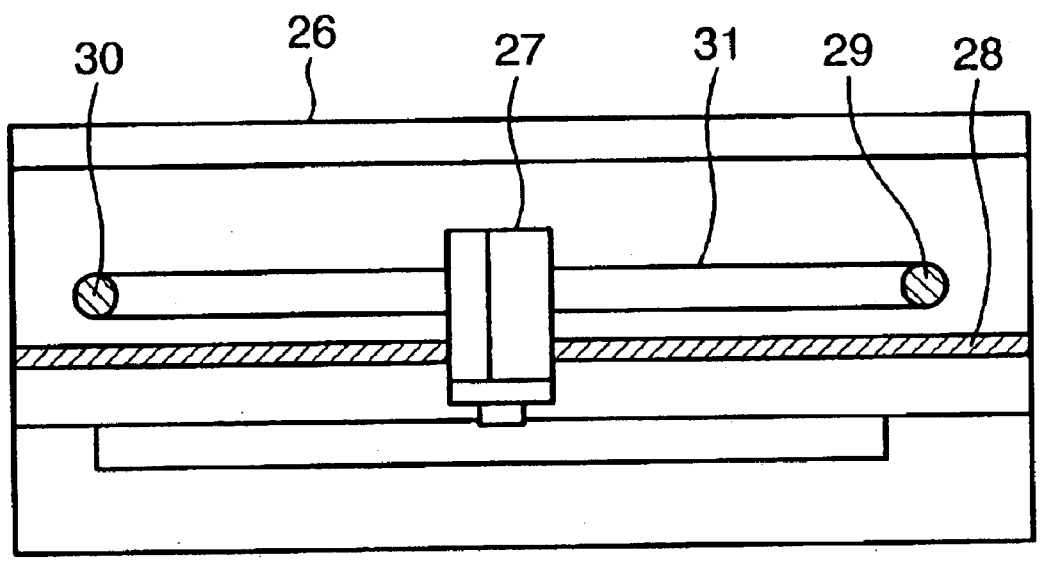
FIG. 4 is a schematic structural view illustrating the front side of an ink-jet printer according to the first embodiment of the present invention.

FIG. 4 is a schematic structural view illustrating the front side of an ink-jet printer 26 according to the first embodiment of the present invention. The ink-jet printer 26 has a carriage 27 on which a printhead is mounted. The carriage 27 is supported on a shaft 28 and the printhead ejects ink while the carriage 27 is moved back and forth along the shaft 28, whereby printing is performed. Part of a timing belt 31 stretched between a pulley 29 attached to the shaft of a carriage motor and a pulley 30 located at a position opposite the pulley 29 is fastened to the carriage 27, thereby transmitting the driving force of the carriage motor.

Figure 5:
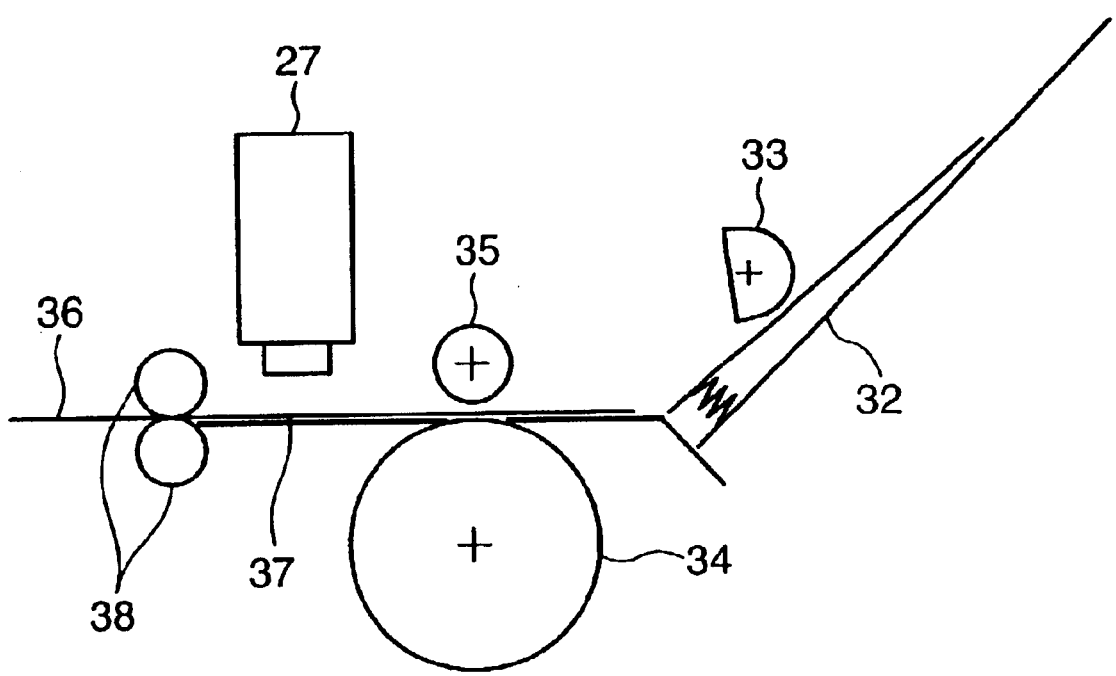
FIG. 5 is diagram showing a side view of an arrangement relating to transfer of paper in the ink-jet printer of FIG. 4.

FIG. 5 is diagram showing a side view of an arrangement relating to transfer of paper in the ink-jet printer of FIG. 4.

As shown in FIG. 5, the arrangement for paper transfer includes a platen 37, a pair of paper ejecting rollers 38, a transfer roller 34, a pinch roller 35, an automatic sheet feeder 32 on which printing paper is stacked for feeding the paper to the platen one sheet at a time, and a paper feed roller 33. Paper 36 fed onto the platen 37 from the automatic sheet feeder 32 one sheet at a time by the paper feed roller 33 is transfered while embraced by the transfer roller 34 and pinch roller 35. These rollers are driven by a-transfer motor (not shown). Further, the paper ejecting rollers 38 are designed so as to rotate somewhat earlier than the transfer roller 34 in order to apply a suitable tension to the paper on the platen 37.

Figure 6:
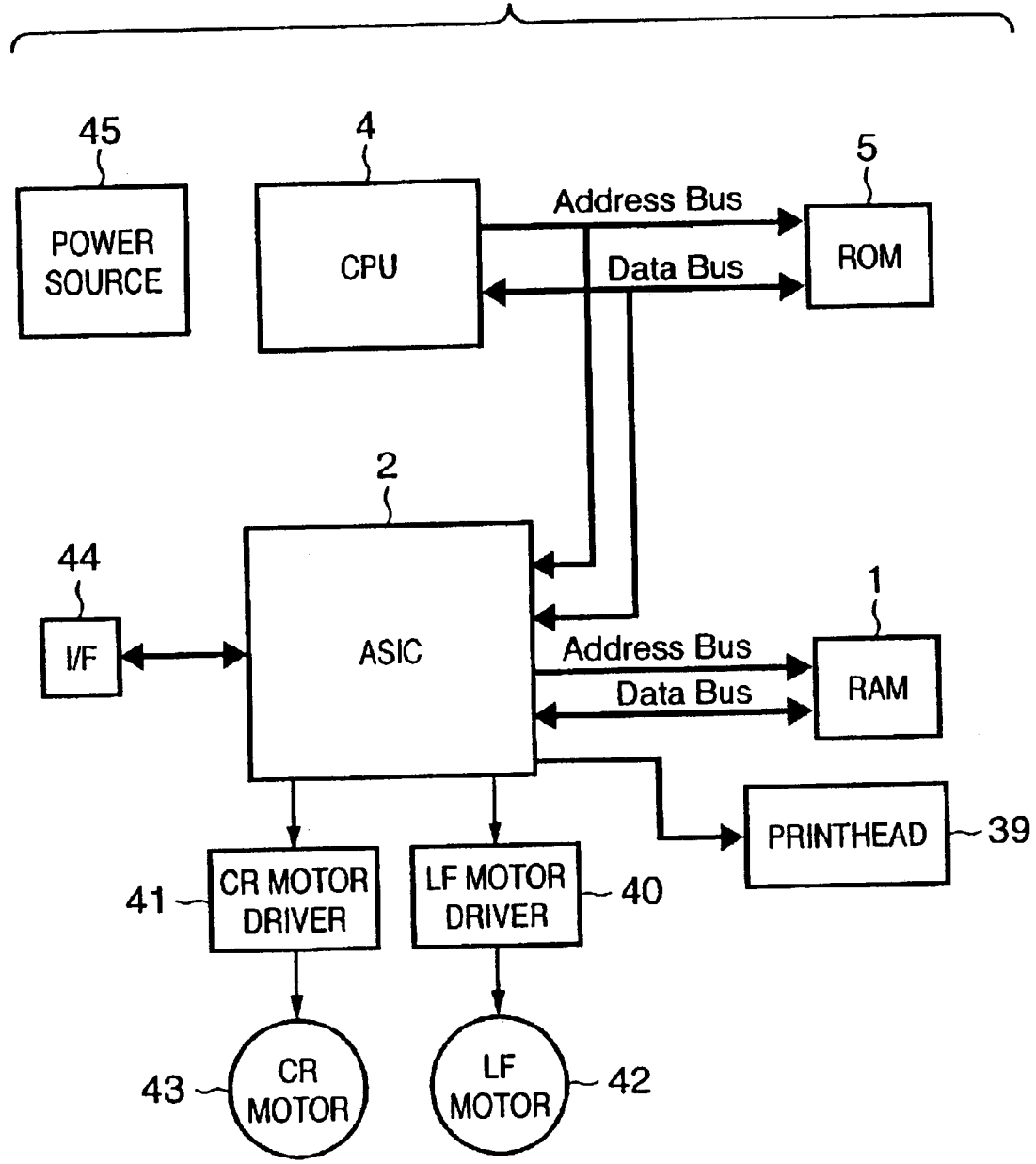
FIG. 6 is a diagram illustrating the overall structure of the electric circuit of the ink-jet printer according to the first embodiment.

FIG. 6 is a diagram illustrating the overall structure of the electric circuit of the ink-jet printer according to the first embodiment.

As shown in FIG. 6, the electric circuit of the printer mainly includes the CPU 4, RAM 1, ROM 5 and ASIC 2, as described earlier. The ASIC 2, while controlling motor drive, executes image processing, communicates with a host computer via an interface 44, and controls ejection of ink from a printhead 39. Image processing includes, e.g., processing for decompressing compressed image data, processing for converting raster-format data to column-format data, and mask processing for downsampling the image data. The CPU 4 controls the ink-jet printer. The CPU 4, in addition to processing for controlling motor drive, executes image processing, communication processing and ink ejection control, thereby setting the ASIC 2. The RAM 1 is used as a working memory for temporarily storing, and applying image processing to, image data transmitted from the host computer, and as an area for storing print data.

A motor driver is constituted primarily by two drivers, namely a carriage motor driver 41 for carriage drive and a line-feed motor driver 40 for paper transfer. Reference numerals 42 and 43 denote the line-feed motor and carriage motor, respectively. The illustrated combination of motor drivers and motors is one example only, and any number of motors and any number of motor drivers may be provided in accordance with the structure of the printer. A power source 45 uses commercial power to generate power for the logic used in driving the semiconductor device, power for driving the motors and power for driving printhead 39.

(Motor Control)

Motor control according to this embodiment will now be described in detail. Control will be described taking as an example a case where stepping motors are used as the motors (carriage motor and line-feed motor) subjected to control.

Figure 1:
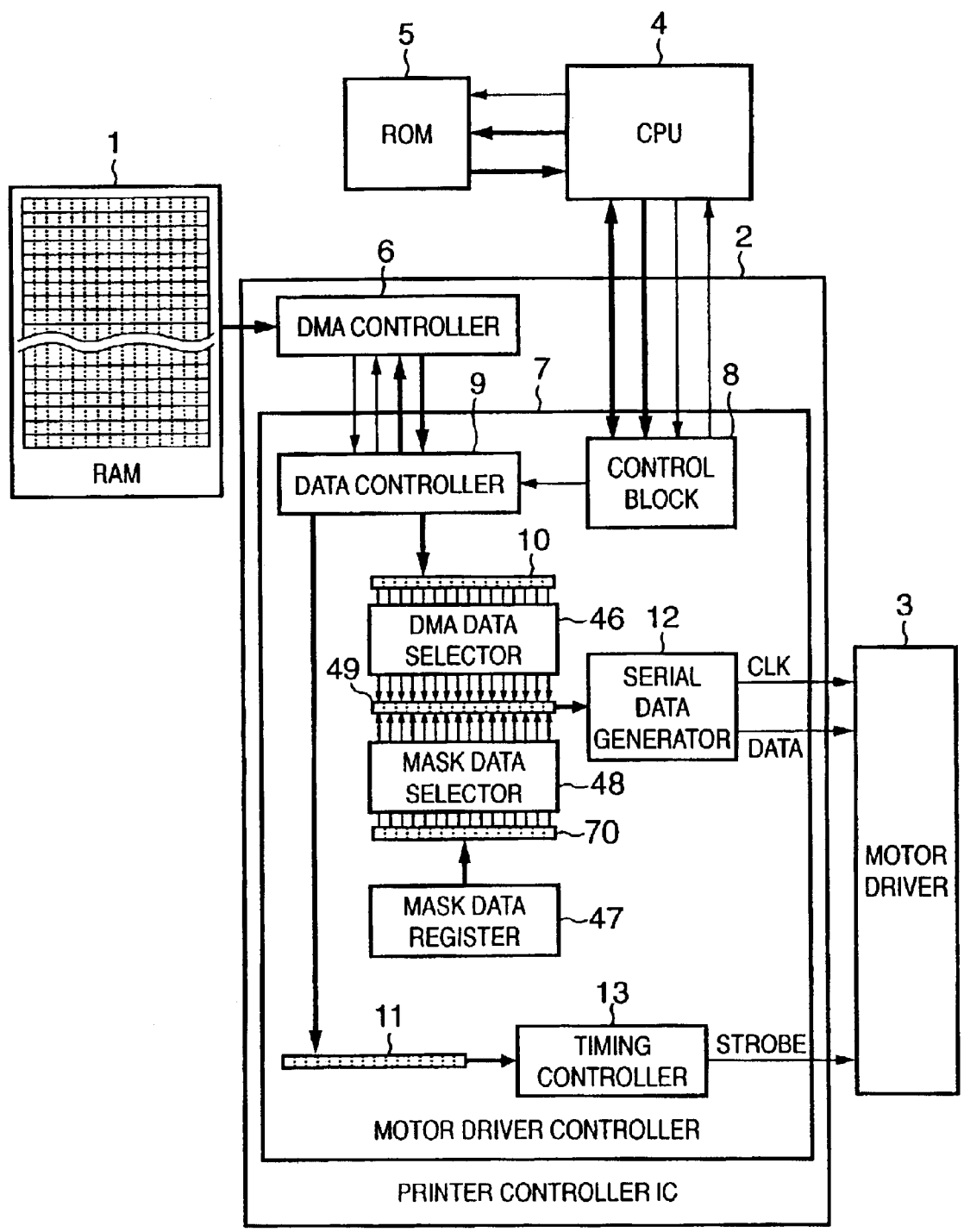
FIG. 1 is a block diagram illustrating an arrangement relating to motor control according to a first embodiment of the present invention.

FIG. 1 is a block diagram illustrating an implementation relating to motor control according to this embodiment. In this embodiment, motor-drive table data obtained from ROM 5 and developed in RAM 1 is incorporated in motor driver controller 7 by DMA transfer, and the motor driver controller 7 transfers this data to motor driver 3 at set excitation time intervals. Components in FIG. 1 similar to those in the prior-art example of FIG. 2 are designated by like reference characters and need not be described in detail again.

Figure 2:
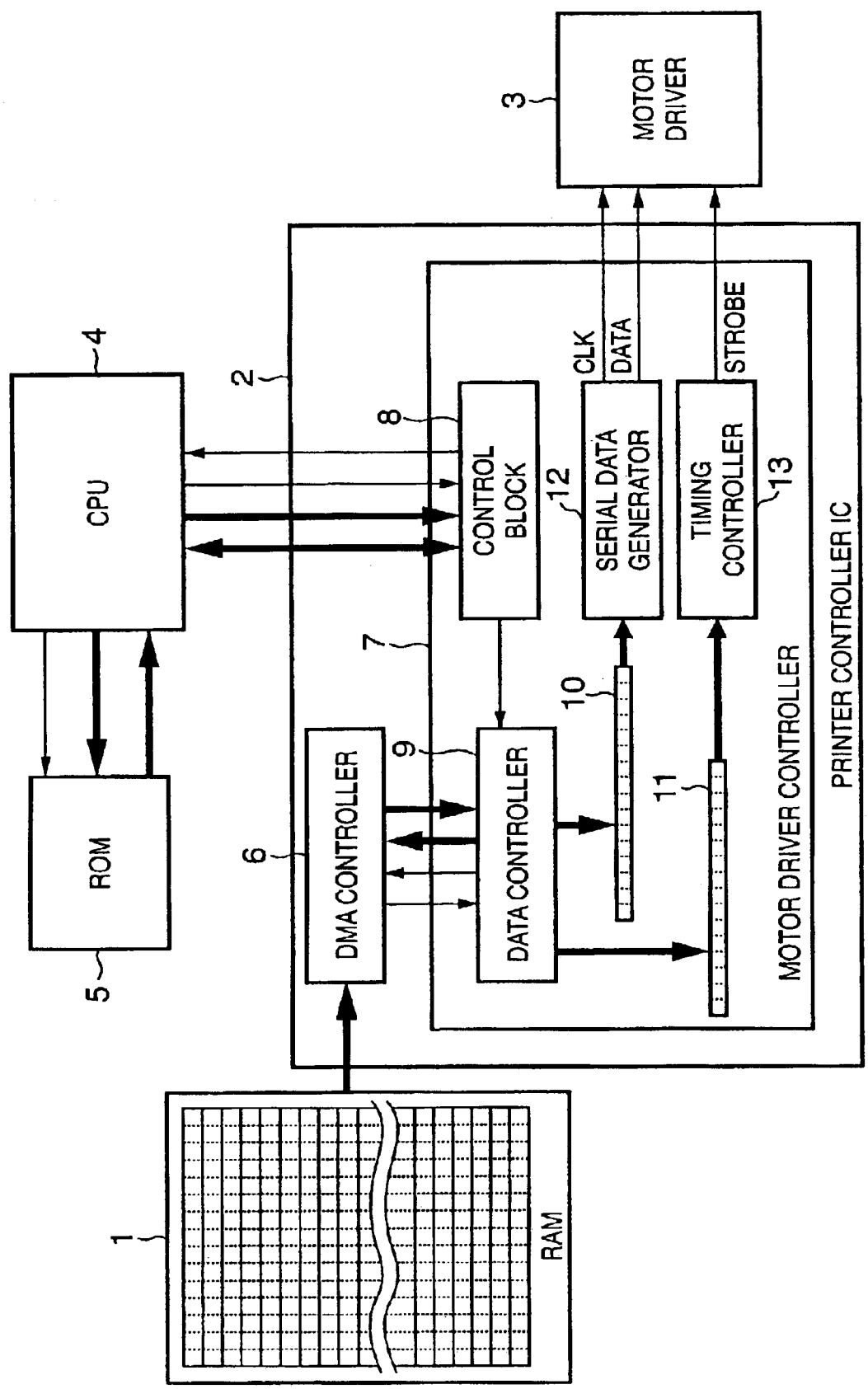
FIG. 2 is a block diagram illustrating an example of a prior-art arrangement for performing motor control using DMA transfer.
Figure 3:
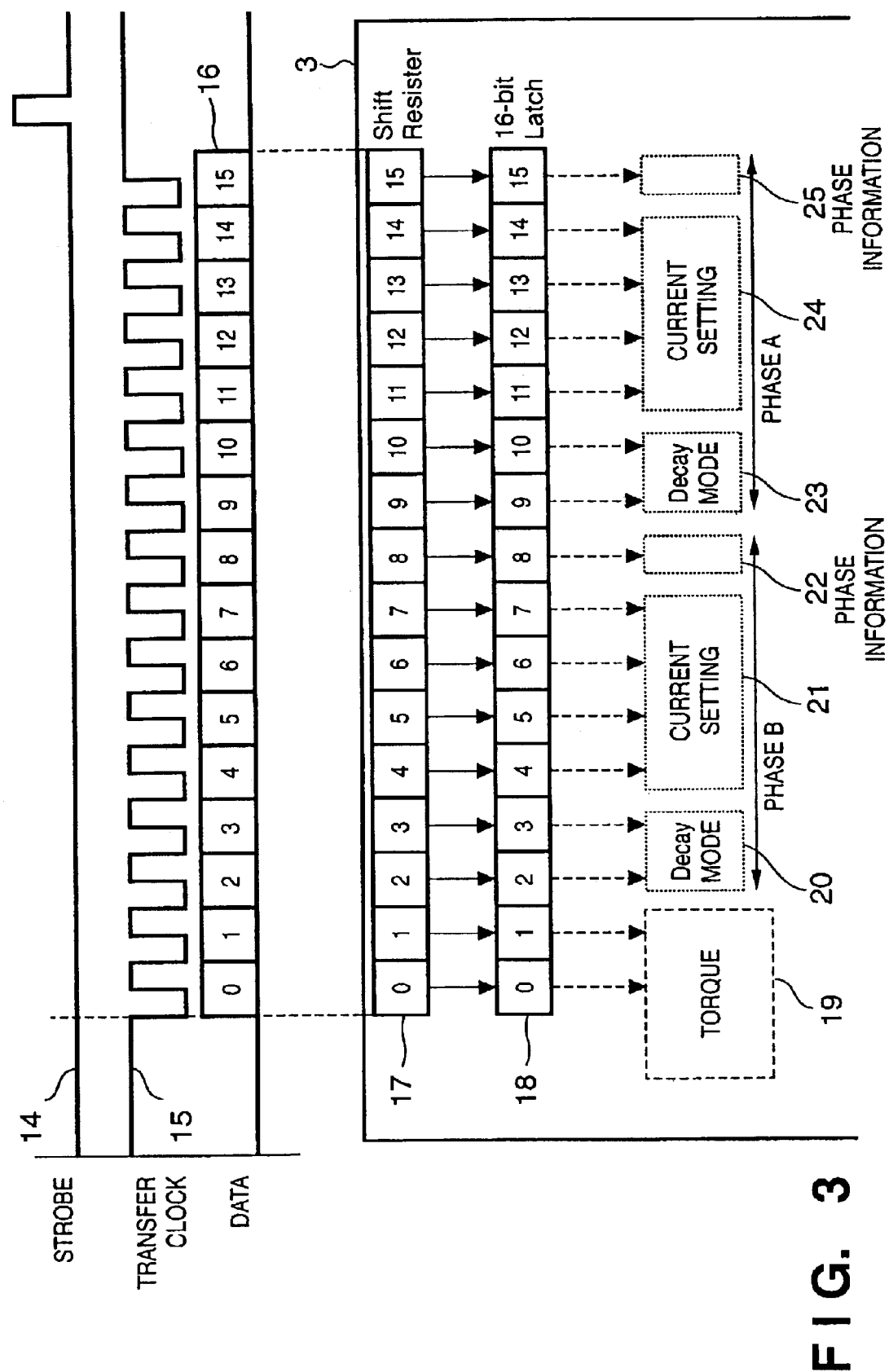
FIG. 3 is a diagram illustrating an example of transfer timing at which drive data is transferred to a motor driver.

The arrangement of FIG. 1 for motor control differs from that of FIG. 2 in that the motor driver controller 7 is additionally provided with a DMA data selector 46, a mask data register 47, a mask data selector 48 and a drive data buffer 49. Mask data 70 has been stored in the mask data register 47.

The DMA data selector 46 selects, bit by bit, motor driver control data 10 that has been latched in the motor driver controller 7 from the RAM 1 by DMA transfer. Selected bits of the motor driver control data 10 are transferred to the drive data buffer 49. The mask data register 47 stores the mask data 70, which is for replacing the values of specific bits of the motor driver control data 10. This mask data is written by the CPU.

Further, this embodiment illustrates an example in which use is made of the mask data register 47 the bit width of which is the same as that of the motor driver control data 10. However, the two need not have identical bit widths. If bits for replacement have already been defined, then it-will suffice for the mask data register 47 to have a bit width that is equal to or greater than these bits. The mask data selector 48 selects, bit by bit, the mask data 70 that has been stored in the mask data register 47. The selected data is transferred to the drive data buffer 49.

With this arrangement, it is possible for specific bits of the motor driver control data 10 acquired by DMA transfer to be masked (overwritten) and replaced with values that have been stored in the mask data register 47. The motor drive control data obtained by replacing the specific bits with values in the mask data register 47 is transferred from the drive data buffer 49 to the serial data generator 12, whence the data is transferred as drive data to the motor driver 3 in accordance with a signal generated by the timing controller 13.

By virtue of the hardware employed, motor control using DMA transfer usually proceeds automatically a pre-set number of steps. At the conclusion of implementation of these number of steps, the motor driver controller 7 generates an interrupt signal. The CPU 4 receives this interrupt signal and writes the leading address of the data representing the next drive pattern, which has been stored in the RAM 1, to the control register of the motor driver controller 7, whereby the data of the next drive pattern is obtained. The control register is located in the control block 8.

Processing when driving is executed according to this embodiment will be described with reference to the flowchart of FIG. 7.

Figure 7:
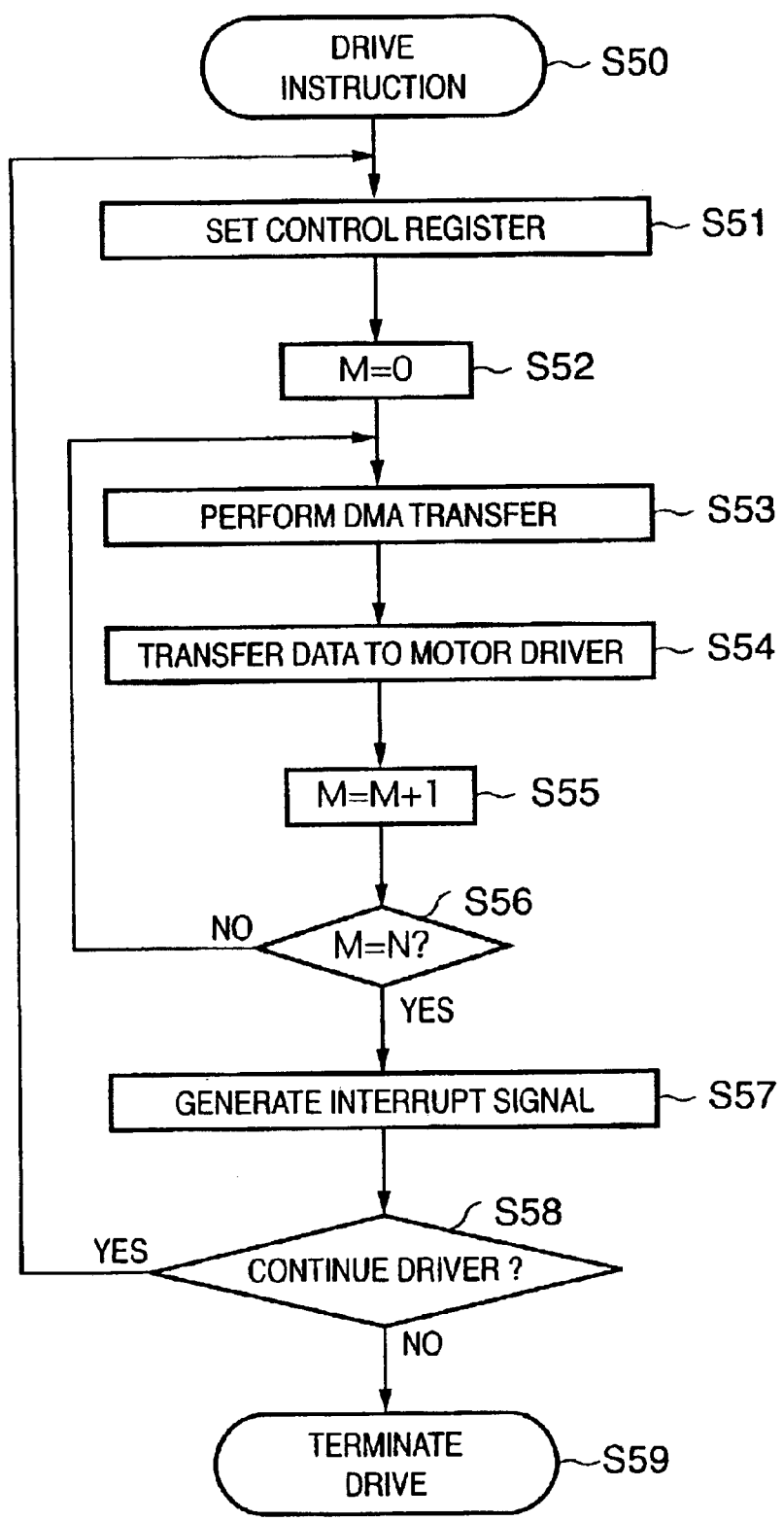
FIG. 7 is a flowchart illustrating processing for when drive is performed according to the first embodiment.

When a motor drive start instruction is executed at step S50 in FIG. 7, the CPU sets the control register of the motor driver controller (step S51). Examples of the parameters set are number N of steps automatically advanced by the hardware, the leading address from which DMA transfer starts from the RAM, etc.

A variable M is cleared to zero at step S52. The variable M represents the number of times the data controller within the motor driver controller has executed DMA transfer from the RAM via the DMA controller. That is, the variable M is equal to the number of steps advanced automatically by DMA transfer. When step S52 is executed, the value in the control register within the motor driver controller that was set at step S51 is latched and preparations are made for drive by the next pattern.

DMA transfer from the RAM is performed at step S53. Next, at step S54, as described above with reference to FIG. 1, specific bits of the motor driver control data obtained by DMA transfer are masked by values that have been stored in the mask data register, whereby drive data is generated and transferred to the motor driver. Then, at step S55, the variable M representing the number of times DMA transfer has been performed is incremented. After the present state is maintained for a specific period of time, it is determined at step S56 whether the value of the DMA transfer count M has attained the step count N automatically advanced by the hardware.

If it is found at step S56 that M is less than N, control returns to step 53 and processing from step S53 onward is repeated so as to continue processing. If it is found that M is equal to N, on the other hand, this means that the stipulated number of steps has been attained and, hence, control proceeds to step S57. Here the motor driver controller generates the interrupt signal and sends it to the CPU.

Upon receiving the interrupt signal, the CPU decides whether to continue or halt drive (step S58). If drive is to be continued, control returns to step S51 and the information of the next pattern is set in the control register. If drive is to be halted, on the other hand, control proceeds to step S59, where drive is terminated. In a case where drive is terminated at step S59, a drive pattern for the purpose of halting drive is set beforehand as a drive pattern of the previous N steps. The CPU determines whether an interrupt has been received a predetermined number of times. For example, if automatic transfer is performed 48 times, then the CPU determines whether the interrupt has been generated three times at step S58.

Thus, during the N (N≧2) steps of operation, drive data is transferred to the motor driver automatically at the set excitation time intervals by the hardware circuit (motor driver controller 7) for motor control. Whenever these N-number of steps ends, the CPU, in response to the interrupt signal generated by the hardware circuit, sets the ensuing data of a drive pattern of N-number of steps.

The timing at which the masking data is written to the mask data register is that at which the CPU receives the interrupt signal from the motor control circuit and sets the information of the next drive pattern in the control register. At this time the CPU writes the data to the mask data register and sets the masking bits in the mask data selector.

Further, unmasked (valid) bits in the motor driver control data DMA-transferred from the RAM are selected in the DMA data selector. As a result, specific bits of the ensuing N steps of drive pattern data are masked and replaced by values stored in the mask data register, and the resultant data is stored in the drive data buffer. The data that has been stored in the drive data buffer is converted to serial data and the serial data is transferred to the motor driver.

Accordingly, information for masking specific bits is set at the timing at which the pattern information of the next N steps is set. The motor driver is driven by the new drive data obtained by masking specific bits of the drive data DMA-transferred from the RAM by the value in the mask data register when N-step drive of the next pattern is carried out.

Similarly, the timing for halting or changing the masking of specific bits of drive data also is the timing at which the next N steps of pattern information is set.

(Drive Data)

Drive data transmitted serially to the motor driver in this embodiment will now be described.

FIG. 10 is a diagram illustrating the content of serial data for performing motor drive according to this embodiment. Phase information for the A phase is set at the 15$^{th}$ bit (bit 15), and phase information for the B phase is set at the 8$^{th}$ bit (bit 8). In a case where the phase is excited on the positive (+) side, "1" is set the above-mentioned bits, and in a case where the phase is excited on the negative (-) side, "0" is set the above-mentioned bits.

The current setting of each phase can be specified in 16 stages represented by four bits. The setting of current relating to the A phase is performed by bits 14 to 11, and the setting of current relating to the B phase is performed by bits 7 to 4. FIG. 11 is a diagram illustrating the relationship between 4-bit set values and current values. As shown in FIG. 11, "1111" signifies setting of 100% (maximum current), and "0000" signifies setting of 0%.

The decay mode sets how regenerative current of current that flows into the motor windings will be regenerated within the motor driver. The mode is set by four modes, namely bits 10 and 9 with regard to the A phase and bits 3 and 2 with regard to the B phase. FIG. 12 is a diagram illustrating the relationship between 2-bit set values and modes set. A slow decay mode is a setting in which regenerative current of current that flows into the motor windings is regenerated by a closed loop within the motor driver and the current is attenuated slowly. On the other hand, the fast decay mode is a setting in which regenerative current is grounded or is regenerated in the motor driving power source current and the current is attenuated quickly. Mixed decay is mode a set intermediate the slow and fast decay modes.

Torque setting bits, namely bits 1 and 0, are common to both the A and B phases. The absolute levels of the currents of both the A and B phases are set while the ratio of the A-phase set current and B-phase set current is maintained. If the torque setting bits are, e.g., "11", then the A-phase set current and B-phase set current are output as is as the output current of the motor driver. However, if the torque setting bits are "00", which signifies 50%, then a current value obtained by making both the A-phase set current and B-phase set current 50% is output from the motor driver to the motor.

(Actual Example of Drive)

Figure 13B:
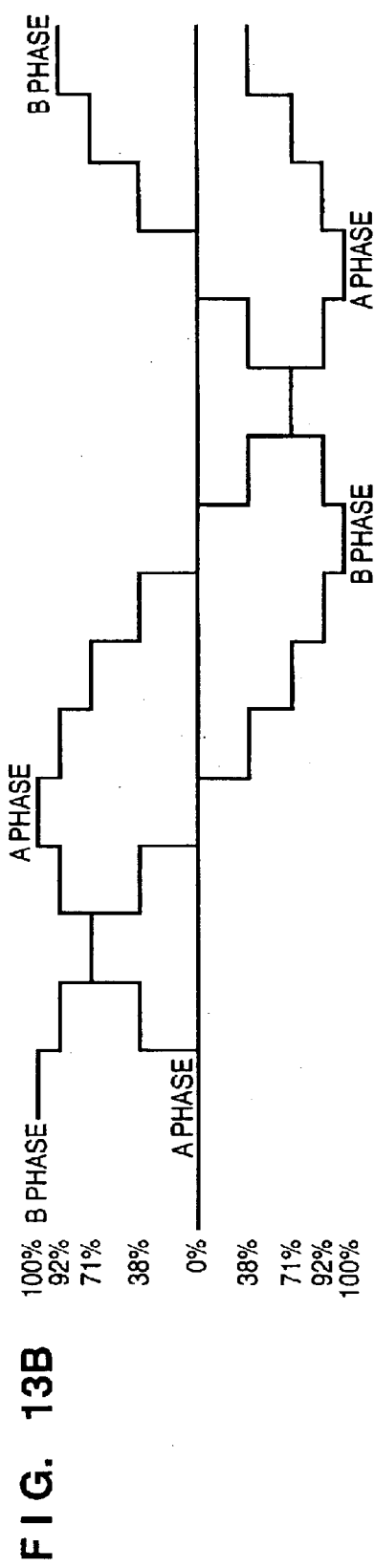
Figure 14:
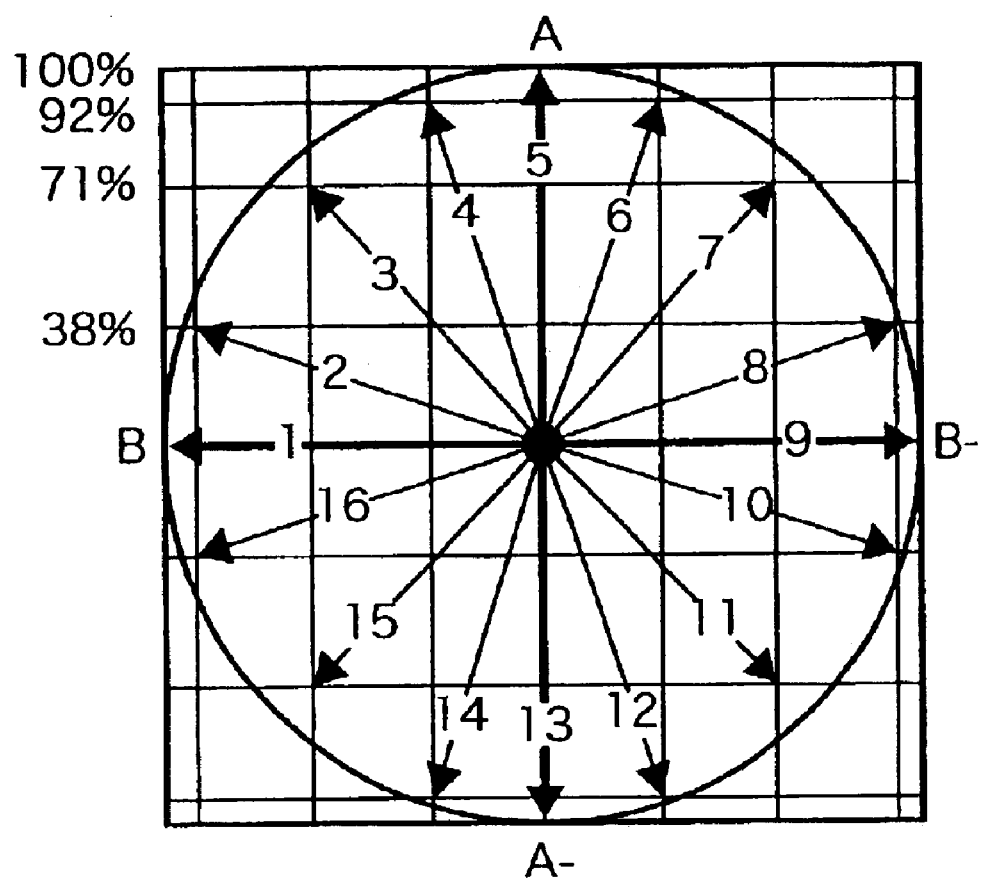
FIG. 14 is a diagram illustrating 16 steps of W1-2 phase drive.

Specific drive data according to this embodiment will now be described. FIGS. 13A and 13B are diagrams illustrating an example of a pattern of W1-2 phase drive. W1-2 phase drive is a method of performing drive by dividing one step of 2-2 phase drive into four parts and dividing four steps of one cycle in 2-2 phase drive into 16 steps of the kind shown in FIG. 14.

FIG. 13A is a diagram illustrating drive data of Step Nos. 1 to 16 from left to right in the bit order shown in FIG. 10, and FIG. 13B is a diagram illustrating the setting of currents of the A and B phases in conformity with each of the steps shown in FIG. 13A. In the example depicted in FIGS. 13A and 13B, the decay mode is mixed decay of 37.5% in the positive-going direction of the current and mixed decay of 75% in the negative-going direction of the current. The torque setting is 100%.

In this case, the number (step count) N of times the hardware (the motor driver controller) of this embodiment transfers drive data to the motor driver automatically is 16. Whenever the 16 steps of operation ends, the CPU, in response to the interrupt signal generated by the hardware, sets the leading address of the RAM, where the next 16 steps of the drive pattern and the excitation time pattern have been stored, in the control register. In a case where the same pattern is repeated, the same leading address is set.

Specifically, the values shown in FIG. 13A are transferred from the RAM to the motor driver controller by DMA transfer 16 bits at a time in correspondence with the order (1 to 16) of the step numbers (STEP No.). The motor driver controller replaces those of the 16 transferred bits that have been selected by the mask data selector with values that have been stored in the mask data register, thereby generating drive data, and transfers this drive data serially to the motor driver at the excitation time intervals.

If masking bits have not been selected by the mask data selector, the following data is transferred serially to the motor driver in order from bit 15 to bit 1 in correspondence with each step:

| | |
|---|---|
| Step No. 1: | 1000010111110111 |
| Step No. 2: | 1010001111001011 |
| ... | |
| Step No. 16: | 0010010111000111 |

In general, when motor drive starts, a large start-up torque is necessary owing to the mechanical friction of the motor to be driven. A large current, therefore, is required. Once drive stabilizes, however, a current as large as that at start-up is not required. Further, from the standpoint of machine noise reduction, it is desired that the current value be reduced after drive stabilization so as to avoid excessive torque.

According to this embodiment, specific bits of data read out from memory (RAM) by DMA transfer are masked and the specific bits are replaced with mask data provided in the motor driver controller. By virtue of this method, the setting of current value can be changed by changing the necessary portion, e.g., the torque setting, irrespective of the fact that the same data is being read out from the memory.

By way of example, assume that the current value is changed to 50% with the drive pattern shown in FIGS. 13A and 13B. By setting the torque setting bits represented by bit 1 and bit 0 such that "00" (50% setting) is set to bit 1 and bit 0 of the mask data register, and by selecting bit 1 and bit 0 of the bit data selector, the data transferred to the motor driver becomes as follows:

| | |
|---|---|
| Step No. 1: | 1000010111110100 |
| Step No. 2: | 1010001111001000 |
| ... | |
| Step No. 16: | 0010010111000100 |

Figure 8:
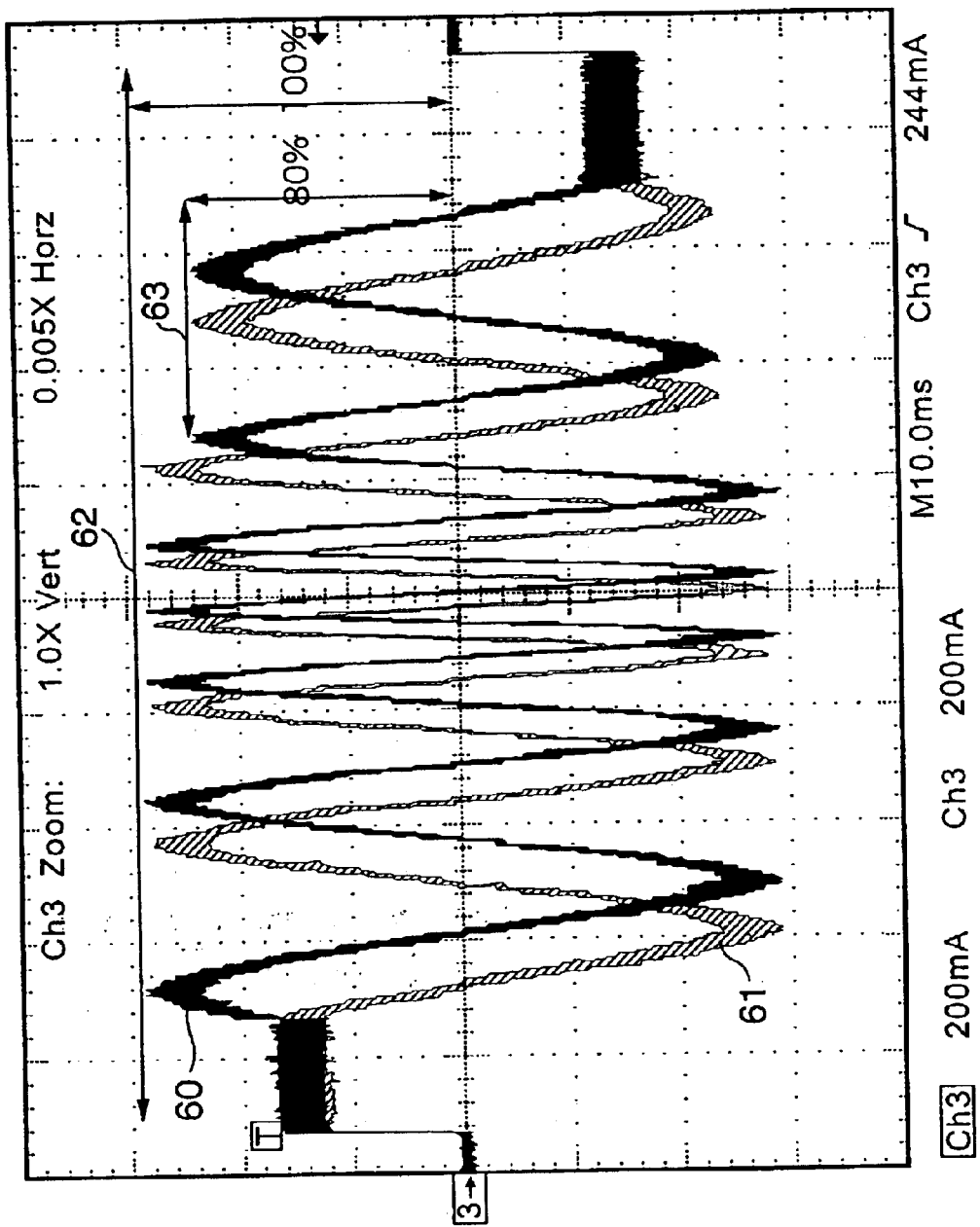
FIG. 8 is a graph illustrating current that flows into the windings of a motor when the motor is driven in order to transfer paper a certain fixed distance.

FIG. 8 is a graph illustrating current that flows into the windings of a motor when the motor is driven in order to transfer paper a certain fixed distance. A drive partitioning method partitions one step of 2-2 phase drive into 16 parts. In other words, this is microstep drive for dividing one cycle of four steps (2-2 phase) into 64 steps. Reference numerals 60, 61 denote A-phase and B-phase currents, respectively. The number N of times the hardware transfers drive data to the motor driver is 64.

Over an entire drive interval 62 in FIG. 8, the same drive pattern data is transferred, in units of N steps each, from the RAM to the motor driver controlled by DMA transfer except over periods of time (10 ms) required for pre-hold and post-hold. In interval 63, part of the torque data represented by bit 1 and bit 0 is masked by mask data and the current value is set to 80%. As a result, the current applied to the motor can be changed regardless of the fact that the same drive table is being read out from memory.

In accordance with this embodiment, as described above, only specific bits of data in a drive table stored in memory can be changed, the number of patterns of a drive pattern table stored in memory can be reduced without increasing CPU load, and therefore it is possible to reduce the memory capacity necessary for motor control.

(Modification of the First Embodiment)

A modification of the first embodiment of the ink-jet printer according to the present invention will now be described. The ink-jet printer of this modification also has a structure similar to that of the first embodiment and identical components need not be described again.

Figure 15:
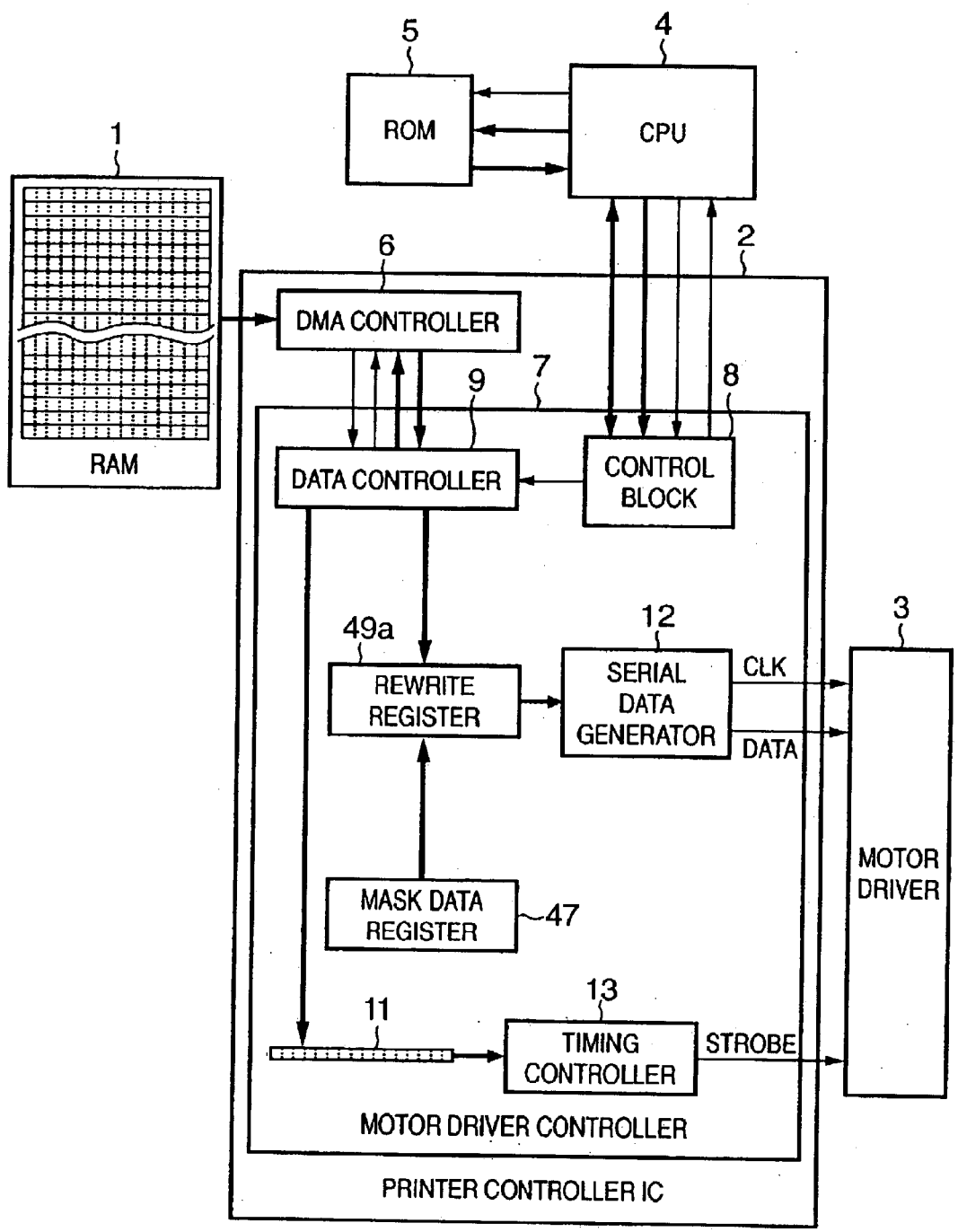
FIG. 15 is a block diagram showing an arrangement relating to control of a motor in an ink-jet printer according to a modification of the first embodiment.

FIG. 15 is a block diagram showing an arrangement relating to control of a motor in an ink-jet printer according to the modification of the first embodiment. As shown in FIG. 15, the motor driver controller 7 includes a rewrite register 49a. The motor driver control data is transferred from the RAM 1 to the rewrite register 49a via the DMA controller 6 and data controller 9.

The rewrite register 49a executes the following processing at the timing at which the motor driver control data is latched:

In a case where mask data is written to the mask data register 47 and a rewrite-enable flag is enabled, part of the motor driver control data within the rewrite register 49a is rewritten by the data in the mask data register 47 and the result is latched in the rewrite register 49a.

If the write-enable flag has been disabled, the motor driver control data acquired by DMA transfer is latched as is without being rewritten, irrespective of the data content of the mask data register 47.

The timing at which the write-enable flag is set is that at which the CPU receives an interrupt signal from the motor control circuit and the information of the next drive pattern is set.

A flag (data ACK signal) indicating that DMA data transmitted from the DMA controller 6 has been established on the data bus is used as the latch timing of the rewrite register 49a. That is, rewrite is executed at the same time that the DMA data is latched from the data bus. As a result, it is unnecessary to produce latch timing anew. This makes implementation easier in terms of circuitry and timing.

The motor driver control data is transferred to the serial data generator 12 and thence to the motor driver 3.

Thus, a value that has been stored in this mask data register is rewritten and transferred with regard to the number N of times drive data is transferred automatically to the motor driver.

(Second Embodiment)

A second embodiment of an ink-jet printer according to the present invention will now be described. The ink-jet printer of the second embodiment has a structure similar to that of the first embodiment. Components similar to those of the first embodiment are not described again, and the description that follows will focus on the characterizing features of the second embodiment.

Figure 9:
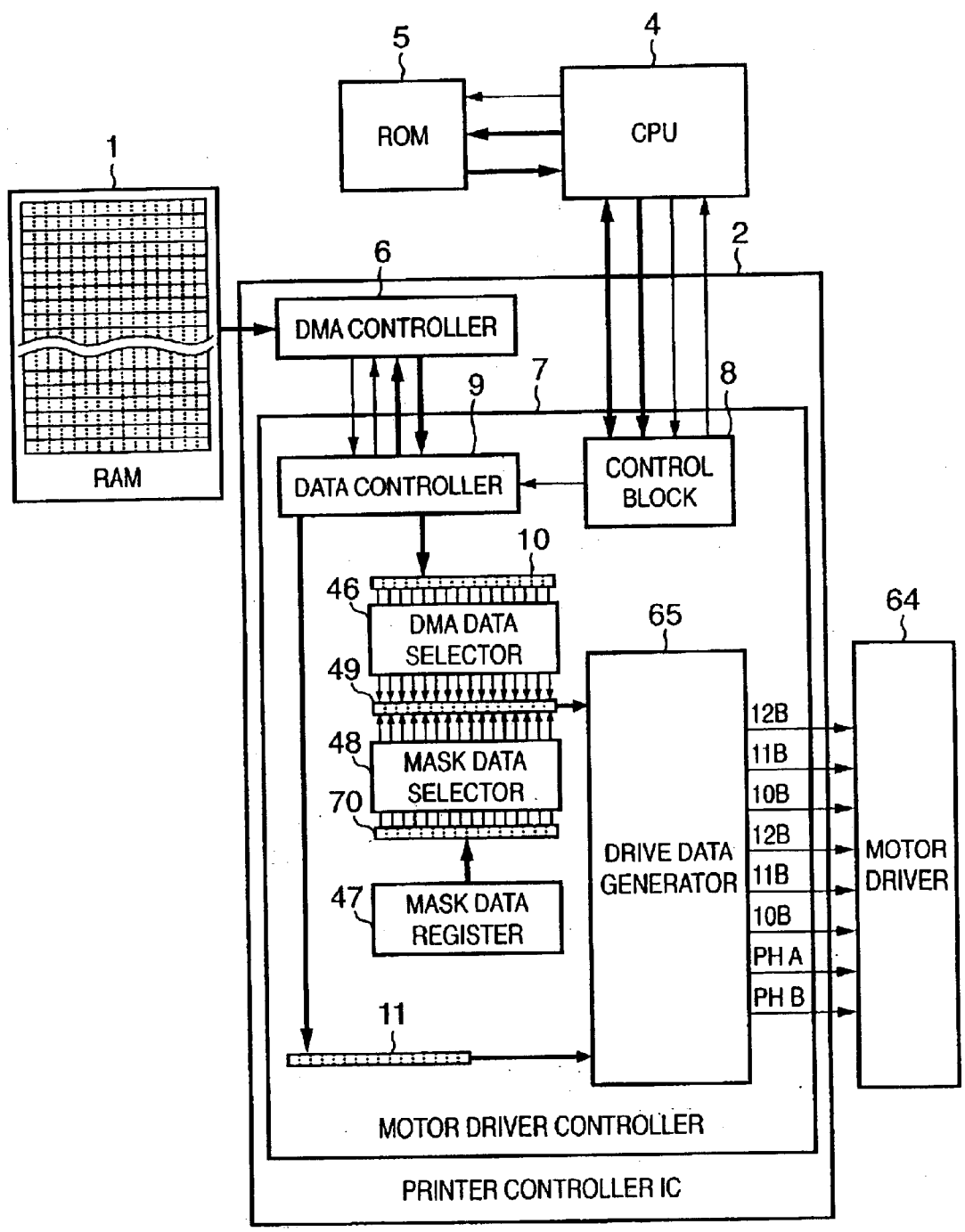
FIG. 9 is a block diagram showing an arrangement relating to control of a motor in an ink-jet printer according to a second embodiment of the invention.

FIG. 9 is a block diagram illustrating an arrangement relating to control of a motor in an ink-jet printer according to a second embodiment of the present invention. A motor driver 64 in FIG. 9 differs from the motor driver 3 of the first embodiment and is so adapted that the control signal enters in parallel fashion. A drive data controller 65 generates parallel data from drive data, which has been stored in the drive data buffer 49, and the time data 11 and transmits the generated parallel data to the motor driver 64 at the set excitation time intervals.

Thus, the motor control method of the present invention can be applied also to a motor driver so adapted that a control signal is input thereto in parallel fashion.

<Other Embodiments>

The above embodiments have been described with regard to a case where the present invention is applied to a carriage motor and line-feed motor. However, the invention is applicable also to a recovery motor, which is provided as a component of an ink-jet printer, for driving recovery means associated with the printhead. The recovery means subjects the print head to operations such as capping, cleaning, pressurization and suction and therefore is effective in achieving stabilized printing.

Further, a DC motor (drive of the motor is by servo-control) may be utilized as the carriage motor and a stepping motor as the line-feed motor.

Furthermore, though a case in which the motor of an ink-jet printer is controlled is described above as an example, the present invention is applicable to various device other than an ink-jet printer so long as the device is one that uses a motor.

With regard to the type of motor, the present invention is applicable to motors other than stepping motors so long as the motor is one that can be controlled by transmitting digital data to a motor driver.

In the first and second embodiments, an example in which the RAM, CPU, ASIC and ROM devices are arranged as independent components is described. However, the CPU and ASIC may be constituted by a single chip. Similarly, the RAM, CPU and ASIC may be constructed as a single chip or all of the devices may be constructed as a single chip.

Further, the RAM may be an SRAM (Static Random-Access Memory), DRAM (Dynamic Random-Access Memory) or SDRAM (Synchronous Dynamic Random-Access Memory). Furthermore, the ROM may be a mask ROM, an OTROM (One-Time ROM) or flash ROM.

The present invention can be applied to a system comprising a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention also includes a case where an OS (operating system) or the like working on the computer performs parts or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

If the present invention is realized as a storage medium, program codes corresponding to the above mentioned flowcharts (FIG. 7) is to be stored in the storage medium.

As is apparent, many different embodiments of the present invention can be made without departing from the spirit and scope thereof, so it is to be understood that the invention is not limited to the specific embodiments thereof except as defined in the appended claims.

What is claimed is:

1. An apparatus for controlling a motor that drives a mechanism using the motor as the power source, said apparatus comprising:
    a motor driver for driving the motor in accordance with an input of digital-format drive data of a predetermined length;
    a memory for storing the drive data, which has been made to correspond to a plurality of drive patterns; and
    driver control means for replacing part of the drive data, which has been read out from said memory by DMA, with other data and outputting the resultant data to said motor driver.

2. The apparatus according to claim 1, wherein the drive data comprises bits of a predetermined length, and said drive control means includes:
    a buffer for storing the drive data;
    a register for storing the other data; and
    a selector for selecting replacement data.

3. The apparatus according to claim 1, wherein said driver control means includes data output means for outputting the drive data, part of which has been replaced, to said motor driver as serial data.

4. The apparatus according to claim 1, wherein said driver control means includes data output means for outputting the drive data, part of which has been replaced, to said motor driver as parallel data.

5. The apparatus according to claim 1, wherein the motor is a stepping motor.

6. A method of controlling a motor in a motor control apparatus, which has a motor driver that drives a motor in accordance with an input of digital-format data of a predetermined length, for driving a mechanism using the motor as a power source, said method comprising:
    a storage step of storing the drive data, which has been made to correspond to a plurality of drive patterns, in a memory; and
    a driver control step of replacing part of the drive data, which has been read out from the memory by DMA, with other data and outputting the resultant data to the motor driver.

7. A computer program for implementing, by a computer, a method of controlling a motor in a motor control apparatus, which has a motor driver that drives a motor in accordance with an input of digital-format data of a predetermined length, for driving a mechanism using the motor as a power source, said program comprising program code corresponding to the following steps:
    a storage step of storing the drive data, which has been made to correspond to a plurality of drive patterns, in a memory; and
    a driver control step of replacing part of the drive data, which has been read out from the memory by DMA, with other data and outputting the resultant data to the motor driver.

8. A storage medium storing a computer program for implementing, by computer, a method of controlling a motor in a motor control apparatus, which has a motor driver that drives a motor in accordance with an input of digital-format data of a predetermined length, for driving a mechanism using the motor as a power source, said program comprising program code corresponding to the following steps:
    a storage step of storing the drive data, which has been made to correspond to a plurality of drive patterns, in a memory; and
    a driver control step of replacing part of the drive data, which has been read out from the memory by DMA, with other data and outputting the resultant data to the motor driver.

9. An electronic apparatus that includes a motor control apparatus having a motor driver that drives a mechanism using the motor as a power source and drives the motor in accordance with an input of digital-format drive data of a predetermined length, a memory for storing the drive data, which has been made to correspond to a plurality of drive patterns, and driver control means for replacing part of the drive data, which has been read out from said memory by DMA, with other data and outputting the resultant data to the motor driver, wherein:
    said driver control means generates an interrupt signal after read-out and output of the drive data are executed a predetermined number of times in succession; and
    a CPU of said electronic apparatus responds to the interrupt signal by specifying an address from which said driver control means reads out data from said memory and changing the other data.

10. The electronic apparatus according to claim 9, wherein a mechanism for transferring a printing medium is driven by the motor.

11. A printing apparatus for perform printing using a motor, comprising:
    a motor driver for driving the motor in accordance with an input of digital-format drive data of a predetermined length;
    a memory for storing the drive data, which has been made to correspond to a plurality of drive patterns;
    driver control means for changing part of the drive data, which has been read out from the memory by DMA, to other data and outputting the resultant data to the motor driver, and for generating an interrupt signal after read-out and output of the drive data are executed a predetermined number of times in succession; and
    control means, responsive to the interrupt signal, for specifying a read-out address of the memory with respect to the driver control means, and setting a change in the drive data.

12. The apparatus according to claim 11, wherein a current value applied to the motor is changed by the change in the drive data.

13. A motor driver controller, to which digital-format drive data of a predetermined length stored in a memory is input by DMA means, for outputting drive data to a motor driver that drives the motor, comprising:
    a mask data register for storing mask data that rewrites the drive data;
    a rewrite register for rewriting predetermined bits by the mask data, which has been stored in the mask data register, when the drive data input by the DMA means is latched, and for holding the resultant data; and
    data output means for outputting drive data, which has entered from said rewrite register, to said motor driver.

* * * * *

UNITED STATES PATENT AND TRADEMARK OFFICE
CERTIFICATE OF CORRECTION

PATENT NO. : 6,747,426 B2
DATED : June 8, 2004
INVENTOR(S) : Takuji Katsu et al.

It is certified that error appears in the above-identified patent and that said Letters Patent is hereby corrected as shown below:

Column 1,
Line 25, "is method" should be deleted.

Column 7,
Line 26, "it-will" should read -- it will --.

Column 11,
Line 20, "latched:" should read -- latched. --.

Signed and Sealed this

Twenty-third Day of November, 2004

JON W. DUDAS
*Director of the United States Patent and Trademark Office*